(12) United States Patent
BenHanokh et al.

(10) Patent No.: US 11,593,035 B2
(45) Date of Patent: Feb. 28, 2023

(54) MANAGING CLIENT DEVICES ASSOCIATED WITH STORAGE NODES IN A SCALE-OUT STORAGE SYSTEM

(71) Applicant: Red Hat, Inc., Raleigh, NC (US)

(72) Inventors: Gabriel Zvi BenHanokh, Tel-Aviv (IL); Joshua Durgin, Canyon Country, CA (US)

(73) Assignee: Red Hat, Inc., Raleigh, NC (US)

( * ) Notice: Subject to any disclaimer, the term of this patent is extended or adjusted under 35 U.S.C. 154(b) by 18 days.

(21) Appl. No.: 17/142,391

(22) Filed: Jan. 6, 2021

(65) Prior Publication Data

US 2022/0214815 A1  Jul. 7, 2022

(51) Int. Cl.
*G06F 12/00* (2006.01)
*G06F 3/06* (2006.01)

(52) U.S. Cl.
CPC ............ *G06F 3/067* (2013.01); *G06F 3/0617* (2013.01); *G06F 3/0647* (2013.01)

(58) Field of Classification Search
CPC .......... G06F 1/26; G06F 1/263; G06F 1/3287; G06F 3/0631; G06F 3/067; G06F 1/266; G06F 3/0625; G06F 9/4875; G06F 9/5094; G06F 11/3433; G06F 11/3485; G06F 2209/5022; G06F 3/0613; G06F 3/0617; G06F 9/505; G06F 9/5083
See application file for complete search history.

(56) References Cited

U.S. PATENT DOCUMENTS

| | | | |
|---|---|---|---|
| 8,904,117 B1 | 12/2014 | Kalekar et al. | |
| 9,152,532 B2 | 10/2015 | Breternitz et al. | |
| 9,652,355 B2 | 5/2017 | Horikawa | |
| 10,565,108 B2 | 2/2020 | Sreedhar M et al. | |
| 10,637,916 B2 | 4/2020 | Ding | |
| 2010/0214940 A1* | 8/2010 | Macauley | H04L 41/12 370/252 |

(Continued)

FOREIGN PATENT DOCUMENTS

CN  208367721 U  1/2019

OTHER PUBLICATIONS

"HPE 3PAR Architecture," Hewlett Packard Enterprise Development LP, 2019, https://h20195.www2.hpe.com/v2/getpdf.aspx/4aa3-3516enw.pdf.

*Primary Examiner* — John A Lane
(74) *Attorney, Agent, or Firm* — Kilpatrick Townsend & Stockton LLP

(57) ABSTRACT

Client devices associated with scale-out storage nodes can be managed based on scale-out storage nodes having backup power supplies. For example, a management node of a scale-out storage system can determine, from among a plurality of storage nodes of the scale-out system, that a first storage node is uncoupled to a backup power supply and that a second storage node is coupled to the backup power supply. The management node can receive device characteristics describing a type of workload and a configuration for a client device associated with the first storage node. The management node can determine the client device satisfies a migration policy based on the device characteristics. The management node can migrate the client device to the second storage node based on the client device satisfying the migration policy.

20 Claims, 3 Drawing Sheets

(56) References Cited

U.S. PATENT DOCUMENTS

| | | | |
|---|---|---|---|
| 2013/0325802 A1* | 12/2013 | Bavishi | G06F 16/119 |
| | | | 707/624 |
| 2017/0046098 A1* | 2/2017 | Yang | G06F 3/0688 |
| 2017/0147383 A1* | 5/2017 | Hudzia | G06F 9/505 |
| 2017/0160779 A1* | 6/2017 | Park | G06F 1/3275 |
| 2017/0344285 A1* | 11/2017 | Choi | G06F 3/0631 |
| 2019/0272016 A1* | 9/2019 | Frias | G06F 9/5094 |
| 2019/0303043 A1* | 10/2019 | Charnevich | G06F 3/0659 |
| 2021/0326047 A1* | 10/2021 | Sillifant | G06F 11/1451 |
| 2022/0075648 A1* | 3/2022 | Magcale | A63C 17/26 |
| 2022/0121572 A1* | 4/2022 | BenHanokh | G06F 1/30 |

* cited by examiner

MANAGING CLIENT DEVICES ASSOCIATED WITH STORAGE NODES IN A SCALE-OUT STORAGE SYSTEM

TECHNICAL FIELD

The present disclosure relates generally to distributed storage systems. More specifically, but not by way of limitation, this disclosure relates to managing client devices associated with storage nodes of a scale-out storage system that have backup power supplies.

BACKGROUND

Distributed storage systems can include storage nodes (e.g., physical servers) in communication with each other over a network for synchronizing, coordinating, and storing data. The storage nodes can work together so that the distributed storage system behaves as one storage system. Distributed storage systems can implement block storage, file storage, or object storage techniques.

There are numerous advantages to using distributed storage systems, such as improved scalability, redundancy, and performance. In particular, distributed storage systems can be implemented as a scale-up storage system that is scaled vertically or a scale-out system that is scaled horizontally. In scale-up storage systems, resources (e.g., CPUs, memory, or storage) are added to a single node until a limit is reached. In scale-out storage systems, nodes are added to the system as necessary. Distributed storage systems are easily scaled horizontally, in the sense that they can combine many storage nodes into a single, shared storage system. Distributed storage systems can also store many copies of the same data for high availability, backup, and disaster recovery purposes. Additionally, some distributed storage systems can execute compute workloads on the same storage nodes that are also used to store data, thereby yielding a hyper-converged infrastructure (HCI) that is highly efficient.

DETAILED DESCRIPTION

Figure 1:
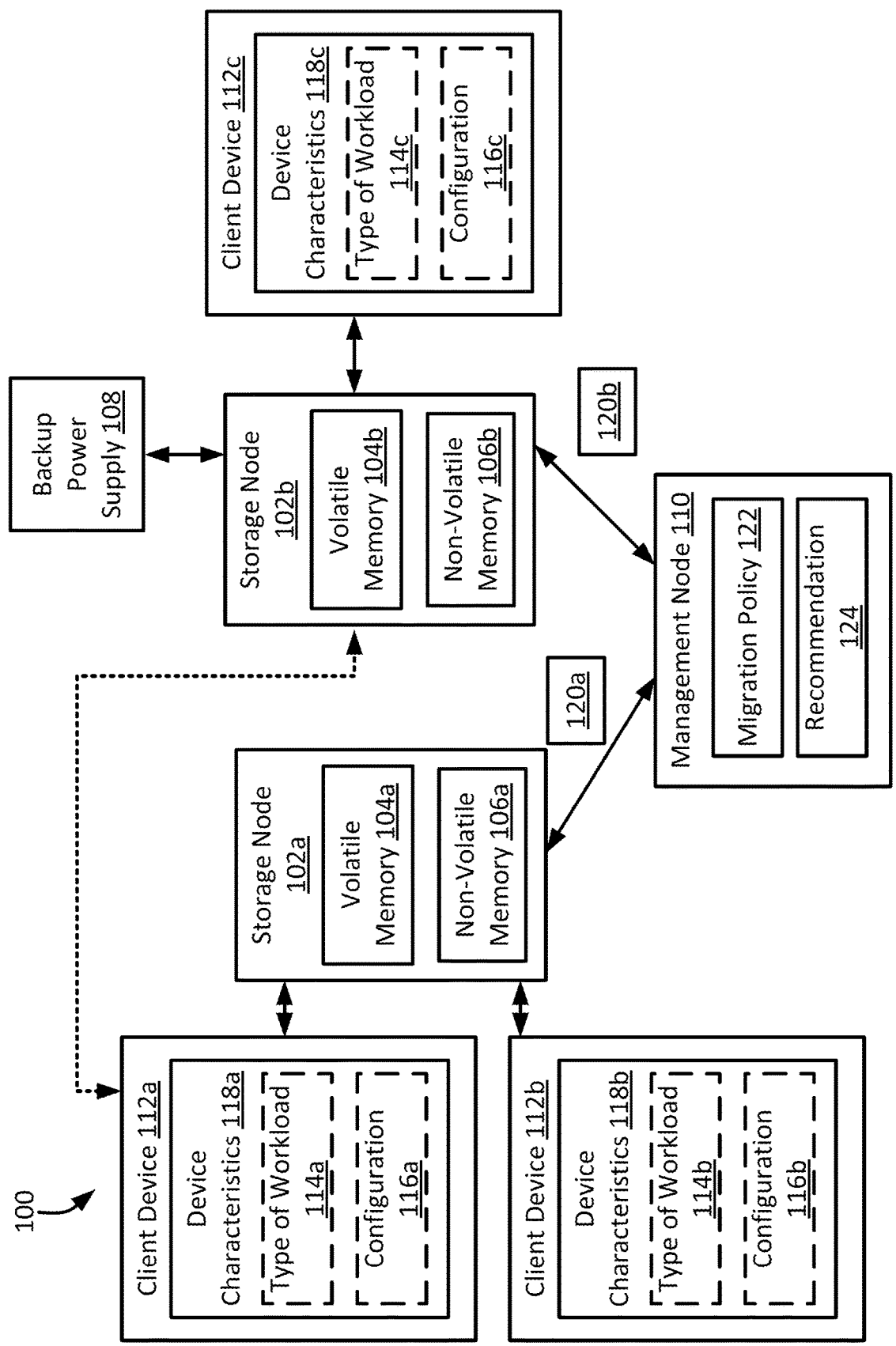
FIG. 1 is a block diagram of an example of a scale-out storage system according to some aspects of the present disclosure.

A scale-out storage system can include storage nodes formed from relatively heterogeneous servers in communication with each other over a network, such as a local area network. Some of the storage nodes may have backup power supplies that can provide emergency power to the storage nodes if a primary source of power is lost. Other storage nodes may lack backup power supplies. In such situations, the scale-out storage system may operate as if all of the storage nodes lack backup power supplies, since scale-out storage systems generally operate on the basis of the lowest common denominator. As a result, the scale-out storage system may not have certain functionality that relies on the storage nodes having backup power supplies, even though such functionality could improve the performance of the scale-out storage system.

One example of such functionality is write-back caching. Write-back caching can involve a system receiving a write request to store data and responsively storing the data in cache memory, without writing the data to disk. The system can maintain the data in the cache memory until an event occurs that makes writing to disk desirable, at which point the system can then write the data to disk. Write-back caching can significantly improve the performance of a storage system because write-back caching allows for data-write aggregation in cache memory and minimizes disk writes, which are relatively slow. But given the volatile nature of cache memory, write-back caching is generally implemented on storage systems that have backup power supplies to prevent cached data from being inadvertently erased due to power loss. As a result, write-back caching is not typically enabled on scale-out storage systems, since it is possible for a set of write requests to be distributed among some storage nodes that have backup power supplies and other storage nodes that lack backup power supplies. Even if the storage nodes that have backup power supplies have write-back caching enabled, only client devices associated with these nodes can benefit. Client devices associated with storage nodes that do not have backup power supplies may be limited in the workloads they can execute, preventing the scale-out storage system from obtaining the performance benefits associated with write-back caching.

Some examples of the present disclosure can overcome one or more of the abovementioned problems by identifying a storage node in a scale-out storage system that does not have backup power supplies, determining device characteristics for a client device associated with the storage node, determining a migration policy is satisfied based on the device characteristics, and migrating the client device to a second storage node in the scale-out storage system that does have backup power supplies. This can allow the client devices with configurations and workloads that would benefit from backup power supplies, such as write-heavy workloads or a spinning disk drive, to associate with storage nodes that have backup power supplies.

One particular example can involve a scale-out storage system with hundreds or thousands of storage nodes. A management node of the scale-out storage system can determine which storage nodes have a backup power supply, such as an uninterruptible power supply (UPS). A storage node can "have" a backup power supply if the storage node is electrically coupled to the backup power supply such that the storage node can receive electrical power from the backup power supply. The management node can receive device characteristics for a client device associated with a storage node that does not have a backup power supply. The device characteristics can indicate the client device is executing a write-intensive workload. Therefore, the client device may benefit from being associated with a storage node that has backup power supplies. The management node can determine that based on the client device executing a write-intensive workload, a migration policy is satisfied. The management node can migrate the client device to a storage node that has a backup power supply and write-back caching enabled. As a result, client devices that benefit the most from write-back caching can be associated with storage nodes with backup power supplies.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a scale-out storage system 100 according to some aspects of the present disclosure. The scale-out storage system 100 includes storage nodes 102a-b. The storage nodes 102a-b may be physical servers for storing data. The storage nodes 102a-b may include volatile memories 104a-b, non-volatile memories 106a-b, or both of these. Examples of non-volatile memory can be a cache memory or random access memory (RAM). Examples of non-volatile memory can include a hard disk (HD) or a solid state drive (SSD).

Storage node 102b can have a backup power supply 108, while storage node 102a may lack backup power supplies. Examples of the backup power supply 108 can include an uninterruptable power supply (UPS) or another battery backup system. The backup power supply 108 can be internal or external (and electrically coupled) to the storage nodes 102b. The storage nodes 102b may have its own backup power supply or the storage nodes 102b can share backup power supplies with other storage nodes.

In some examples, a management node 110 can determine which of the storage nodes 102a-b have a backup power supply. Each storage node 102a-b can transmit an indication to the management node 110 of whether the storage nodes 102a-b have a backup power supply. Each storage node 102a-b may be configured to analyze their hardware to determine if they have a corresponding backup power supply. For example, storage node 102b may analyze its hardware and determine that backup power supply 108 is attached. And storage nodes 102a may analyze its hardware and determine that it lacks backup power supplies. The storage nodes 102a-b may analyze their hardware to determine if they have a backup power supply in response to any suitable event. For example, the storage nodes 102a-b may each analyze their hardware to detect the presence of a backup power supply in response to a boot up event. As another example, the storage nodes 102a-b may each analyze their hardware to detect the presence of a backup power supply in response to the passage of a predefined amount of time, such as one hour. As yet another example, the storage nodes 102a-b may each analyze their hardware to detect the presence of a backup power supply in response to a request from the management node 110 of the scale-out storage system 100. The management node 110 can receive an indication from each of the storage nodes 102a-b of whether they have a backup power supply. Based on the indication, the management node 110 can determine which storage nodes 102a-b have a backup power supply.

The management node 110 is configured to manage one or more aspects of the scale-out storage system 100. For example, the management node 110 can manage which storage nodes 102a-b have write-back caching enabled or disabled. The management node 110 may also manage which client devices 112a-c are associated with which storage nodes 102a-b, as described below. Examples of the client devices 112a-c can include laptop computers, desktop computers, servers, or mobile devices. The client devices 112a-c may be external to the scale-out storage system 100.

In some examples, the management node 110 can receive the indications from the storage nodes 102a-b and determine storage node 102b is coupled to backup power supply 108. Write-back caching can then be enabled on the storage nodes 102b. For example, the management node 110 can transmit signals to the storage nodes 102b for causing the storage node 102b to enable write-back caching. Each signal can include a command or other information configured to cause a corresponding storage node to enable write-back caching. In some examples, the storage nodes 102b may automatically enable write-back caching in response to determining that they have a backup power supply 108. In still other examples, a system administrator may manually enable write-back caching on the storage node 102b based on determining that the storage node 102b has the backup power supply 108. By using one or more of the above techniques, write-back caching can be enabled on the storage node 102b.

Write-back caching can involve storing data in a volatile memory for a period of time before writing the data to non-volatile memory. As one particular example, a storage node 102b can receive a write request for writing data to memory. In response to the write request, the storage node 102b may only write the data to volatile memory 104b. That is, the storage node 102b may not write the data to the non-volatile memory 106b yet. At a later point in time, the storage node 102b can detect an event. An example of the event can include the storage node 102b entering an idle state. In response to detecting the event, the storage node 102b can then proceed to write the data to the non-volatile memory 106b. For example, the storage node 102b can obtain the data from the volatile memory 104b, write the data to the non-volatile memory 106b, and erase the data from the volatile memory 104b. By maintaining the data in the volatile memory 104b for a time period before writing the data to non-volatile memory 106b, the storage node 102b can perform various data operations (e.g., data writes) on the data in the volatile memory 104b during that time period, which can be significantly faster than performing the same data operations in non-volatile memory 106b.

In some examples, the management node 110 can also determine storage node 102a is not coupled to backup power supplies. The management node 110 may then transmit a signal to the storage nodes 102a for causing the storage node 102a to disable write-back caching. The signal can include a command or other information configured to cause the storage node 102a to disable the write-back caching functionality.

In some examples, the management node 110 can receive device characteristics 118a-c describing the client devices 112a-c. The device characteristics 118a-c can include a type of workload 114a-c the client device is executing and a configuration 116a-c of the client device. Examples of the type of workload 114a-c can include a read-intensive workload, a write-intensive workload, or write-ahead-log with many writes, and the like. Examples of the configuration can include a type and number of resources (e.g., spinning drives, solid state drives (SSDs), persistent memory, a temporary file system, etc.).

The storage nodes 102a-b can determine the device characteristics 118a-c for client devices 112a-c associated with the storage node. For example, the storage node 102a can determine the device characteristics 118a-b for the client devices 112a-b associated with the storage node 102a. Each of the storage nodes 102a-b can then transmit a status communication 120a-b that includes the respective device characteristics over a network (e.g., a local area network or the Internet) to the management node 110.

In some example, the management node 110 can include a migration policy 122 for determining which client devices 112a-c are to be associated with which storage node 102a-b. The migration policy 122 may include criteria, such as device characteristics, that are to be satisfied for migrating a client device to a storage node with a backup power supply, maintaining a client device association with a storage node with a backup power supply, migrating a client device to a storage node without a backup power supply, maintaining a client device associated with a storage node without a backup power supply, or a combination thereof. While examples of the migration policy 122 are described herein, it will be appreciated that the management node 110 can implement any suitable migration policy for specifying client devices to migrate between storage nodes with backup power supplies.

In some examples, the migration policy 122 can involve a client device being associated with a storage node that does not have a backup power supply and the client device executing a write-intensive workload. For example, based on the device characteristics 118a in the status communication 120a indicating the client device 112a is executing a write-intensive workload and the client device 112a being associated with the storage node 102a that does not have a backup power supply, the management node 110 can determine the migration policy 122 is satisfied for the client device 112a. The management node 110 can migrate the client device 112a to the storage node 102b based on the migration policy 122 being satisfied and the storage node 102b having the backup power supply 108.

In some examples, the migration policy 122 can involve the client device being associated with a storage node that does not have a backup power supply and the client device having a configuration that includes a spinning disk drive. For example, based on the device characteristics 118a in the status communication 120a indicating the client device 112a includes a configuration 116a with a spinning disk drive and the storage node 102a does not have a backup power supply, the management node 110 can determine the migration policy 122 is satisfied for the client device 112a. The management node 110 can migrate the client device 112a to the storage node 102b based on the migration policy 122 being satisfied and the storage node 102b having the backup power supply 108.

The migration policy 122 can also involve a client device that does not have a backup power supply executing a workload of reads that are waiting for write. An I/O history and a machine learning model trained using previous I/O histories may be used to recognize these workloads. Additionally or alternatively, the migration policy 122 can involve a client device that does not have a backup power supply holding a write-ahead-log with many writes waiting. For each of these migration policies, the management node 110 can migrate the client devices 112a-c satisfying the migration policy 122 to the storage node 102b with the backup power supply 108.

Client devices that have a spinning disk drive or a work-ahead-log with many writes waiting may benefit from being associated with a storage node that has a backup power supply. The management node 110 can migrate the client devices 112a-c between storage nodes 102a-b based on the migration policy 122 including any of these characteristics and the client devices 112a-c satisfying the migration policy 122.

In some examples, client devices writing to a temporary file system (e.g., tmpfs) or including a persistent memory may not benefit from a backup power supply. Accordingly, the management node 110 can maintain or migrate client devices 112a-c to storage node 102a without a backup power supply based on the migration policy 122 specifying one of these conditions and the client devices 112a-c satisfying the migration policy 122. As one particular example, the migration policy 122 can specify that a client device writing to a temporary file system is to be associated with a storage node that does not have backup power supply. The management node 110 can determine client device 112b is writing to a temporary file system based on the device characteristics 118b, and therefore that the migration policy 122 is satisfied. The management node 110 can maintain the association of the client device 112b with the storage node 102a based on the migration policy 122 being satisfied.

In some examples, the management node 110 can determine to maintain an association of a client device with a storage node based on the client device not satisfying the migration policy 122. For example, the migration policy 122 can involve the configuration of the client device having a spinning disk drive. The management node 110 can determine the configuration 116b of the client device 112b does not include a spinning disk drive. As a result, the management node 110 can determine the migration policy 116 is not satisfied and maintain the association of the client device 112b with the storage node 102a.

In some examples, the management node 110 can generate a recommendation 124 for a number of the storage nodes 102a-b to be coupled to one or more backup power supplies. The management node 110 can determine the recommendation 124 based on the device characteristics 118a-c. For example, the device characteristics 118a-c can indicate that client devices 112a-c all regularly execute write-intensive workloads. The management node 110 can determine the scale-out storage system 100 may benefit from both of the storage nodes 102a-b having a backup power supply. The management node 110 can output the recommendation 124 to a user, such that a user (e.g., a field engineer) can add or remove backup power supplies in the scale-out storage system 100 to meet the recommendation 124.

It will be appreciated that FIG. 1 is intended to be illustrative and non-limiting. Other examples may include more components, fewer components, different components, or a different arrangement of the components shown in FIG. 1. For instance, although the scale-out storage system 100 includes two storage nodes in the example of FIG. 1, the scale-out storage system 100 may have hundreds or thousands of storage nodes in other examples.

Figure 2:
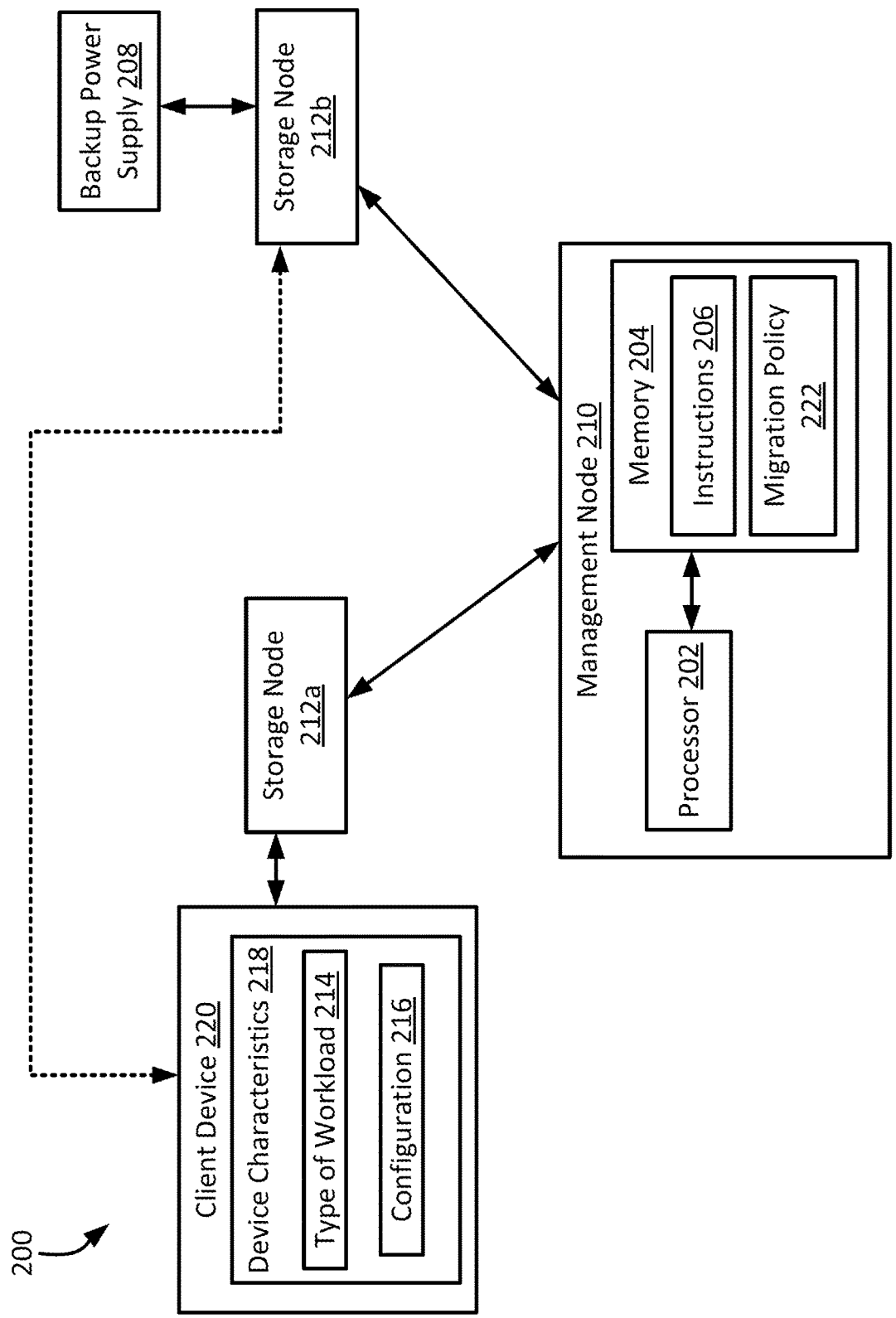
FIG. 2 is a block diagram of another example of a scale-out storage system according to some aspects of the present disclosure.

FIG. 2 is a block diagram of another example of a scale-out storage system 200 according to some aspects of the present disclosure. The scale-out storage system 200 includes a management node 210, a plurality of storage nodes 212a-b, and a backup power supply 208 coupled to a second storage node 212b.

In this example, the management node 110 includes a processor 202 communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 of the management node 210 can execute the instructions 206 to perform operations. For example, the processor 202 can determine, from among the plurality of storage nodes 212a-b of the scale-out storage system 200, that a first storage node 212a is uncoupled to a backup power supply and that a second storage node 212b is coupled to the backup power supply 208. The processor 202 can receive device characteristics 218 describing a type of workload 214 (e.g., read-intensive or write intensive) and a configuration 216 (e.g., client device 220 includes a solid state drive) for a client device 220 associated with the first storage node 212a. The processor 202 can determine the client device 220 satisfies a migration policy 222 based on the device characteristics 218. For example, the migration policy 222 can include the type of workload being a write-intensive workload. The processor 202 can determine the type of workload 214 of the client device 220 is write-intensive, and therefore determine the migration policy 222 is satisfied. The processor 202 can migrate the client device 220 to the second storage node 212b based on the client device 220 satisfying the migration policy 222. This may aid in associating client devices that can benefit the most from write-back caching with storage nodes that have write-back caching enabled because they have a backup power supply.

Figure 3:
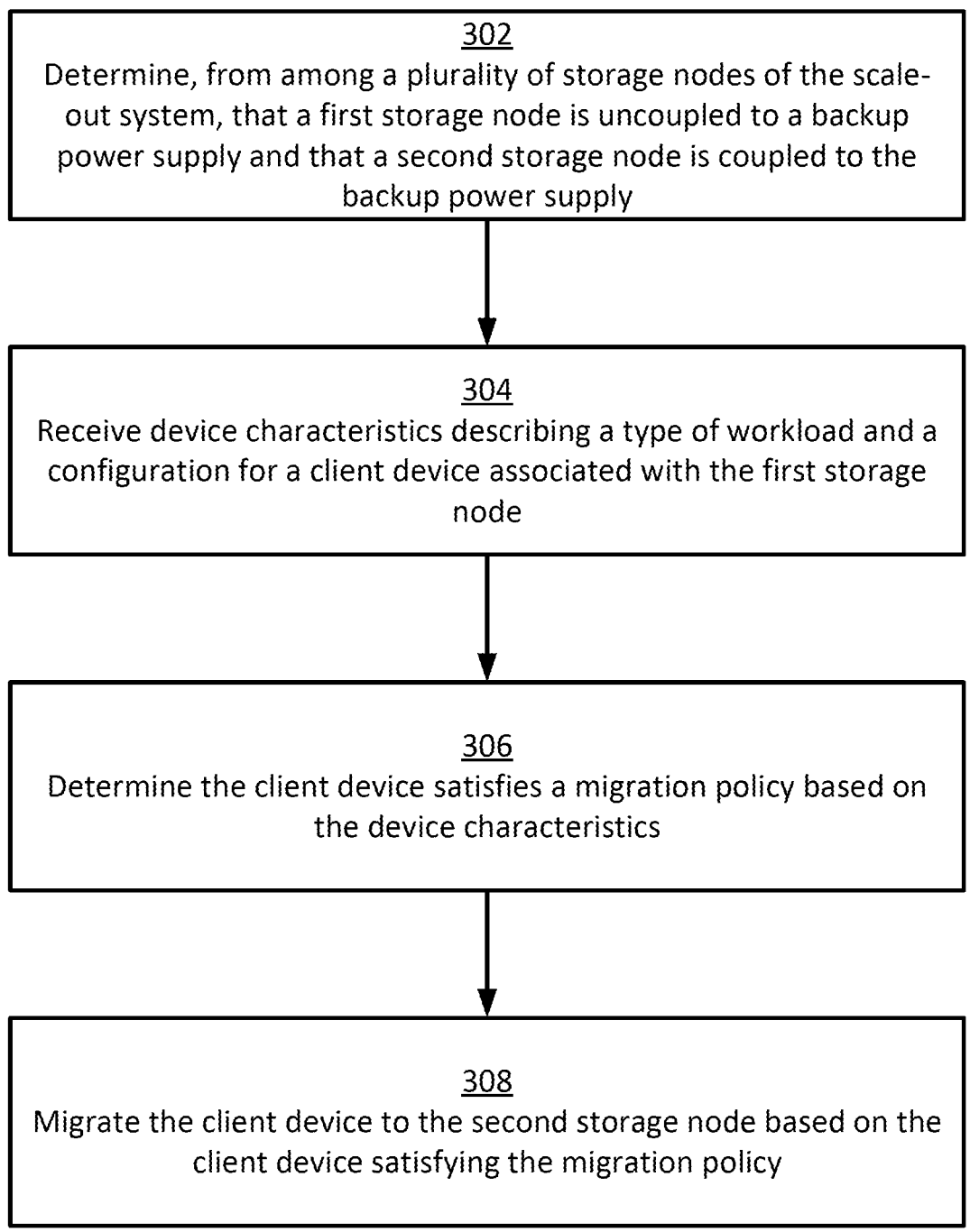
FIG. 3 is a flow chart of an example of a process for managing client devices associated with storage nodes according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 of a management node 210 can determine, from among a plurality of storage nodes 212a-b of a scale-out storage system 200, that a first storage node 212a is uncoupled to a backup power supply 208 and that a second storage node 212b is coupled to the backup power supply 208. The processor 202 may receive an indication from each of the plurality of storage nodes 212a-b about whether the respective storage node is coupled to the backup power supply 208.

In block 304, the processor 202 can receive device characteristics 218 describing a type of workload 214 and a configuration 216 for a client device 220 associated with the first storage node 212a. The type of workload 214 can include a write-intensive workload, a read-intensive workload, reads waiting for write, a write-ahead-log with many waiting writes, etc. The configuration 216 can include a number and type of resources the client device 220 has, such as a spinning disk drive, a persistent memory, a temporary file system, etc. The first storage node 212a can be configured to determine the device characteristics 218 and responsively transmit a status communication indicating the device characteristics 218 to the management node 210.

In block 306, the processor 202 can determine the client device 220 satisfies a migration policy 222 based on the device characteristics 218. The migration policy 222 can specify device characteristics 218 to be satisfied for the client device 220 to associate the client device 220 with the second storage node 212b that has the backup power supply 208. For example, the migration policy 222 can include the type of workload 214 being a write-intensive workload or the configuration 216 of the client device 220 including a spinning disk drive. Client devices with write-intensive workloads and spinning disk drives may benefit from being associated with the second storage node 212b that has the backup power supply 208 and write-back caching enabled.

In block 308, the processor 202 can migrate the client device 220 to the second storage node 212b based on the client device 220 satisfying the migration policy 222. This can aid in client devices that would benefit the most from write-back caching associating with storage nodes with backup power supplies, and thus optimizing performance of the scale-out storage system 200.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A management node of a scale-out system, the management node comprising:
   a processor; and
   a memory including instructions that are executable by the processor for causing the processor to:
      determine, from among a plurality of storage nodes of the scale-out system, that a first storage node is uncoupled to a backup power supply and that a second storage node is coupled to the backup power supply, each storage node of the plurality of storage nodes being configured to analyze their hardware to detect a presence of the backup power supply and send an indication of the presence to the management node;
      receive device characteristics describing a first type of workload and a configuration for a client device associated with the first storage node, the configuration specifying a second type of a plurality of resources of the client device and a number of each resource of the plurality of resources;
      determine the client device satisfies a migration policy based on the device characteristics; and
      migrate the client device to the second storage node based on the client device satisfying the migration policy.

2. The management node of claim 1, wherein the client device is a first client device and the memory further includes instructions that are executable by the processor for causing the processor to:
   receive, from the first storage node, device characteristics describing the first type of workload and the configuration for a second client device associated with the first storage node;
   determine the second client device does not satisfy the migration policy; and
   maintain the second client device association with the first storage node.

3. The management node of claim 1, wherein each storage node in the plurality of storage nodes is configured to determine the device characteristics and responsively transmit a status communication indicating the device characteristics to the management node.

4. The management node of claim 1, wherein the memory further includes instructions that are executable by the processor for causing the processor to:
  receive device characteristics for each storage node in the plurality of storage nodes; and
  generate a recommendation indicating a number of the plurality of storage nodes to be coupled to one or more backup power supplies based on the device characteristics.

5. The management node of claim 1, wherein the memory further includes instructions that are executable by the processor for causing the processor to enable write-back caching for the second storage node based on the second storage node being coupled to one or more backup power supplies.

6. The management node of claim 1, wherein the migration policy comprises the first type of workload being a write-intensive workload.

7. The management node of claim 1, wherein the migration policy comprises the configuration of the client device includes a spinning disk drive.

8. A computer-implemented method comprising:
  determining, from among a plurality of storage nodes of a scale-out system, that a first storage node is uncoupled to a backup power supply and that a second storage node is coupled to the backup power supply, each storage node of the plurality of storage nodes being configured to analyze their hardware to detect a presence of the backup power supply and send an indication of the presence to the management node;
  receiving device characteristics describing a first type of workload and a configuration for a client device associated with the first storage node, the configuration specifying a second type of a plurality of resources of the client device and a number of each resource of the plurality of resources;
  determining the client device satisfies a migration policy based on the device characteristics; and
  migrating the client device to the second storage node based on the client device satisfying the migration policy.

9. The method of claim 8, wherein the client device is a first client device and the method further comprises:
  receiving, from the first storage node, device characteristics describing the first type of workload and the configuration for a second client device associated with the first storage node;
  determining the second client device does not satisfy the migration policy; and
  maintaining the second client device association with the first storage node.

10. The method of claim 8, wherein each storage node in the plurality of storage nodes is configured to determine the device characteristics and responsively transmit a status communication indicating the device characteristics to a management node of the scale-out system.

11. The method of claim 8, further comprising:
  receiving device characteristics for each storage node in the plurality of storage nodes; and
  generating a recommendation indicating a number of the plurality of storage nodes to be coupled to one or more backup power supplies based on the device characteristics.

12. The method of claim 8, further comprising enabling write-back caching for the second storage node based on the second storage node being coupled to one or more backup power supplies.

13. The method of claim 8, wherein the migration policy comprises the first type of workload being a write-intensive workload.

14. The method of claim 8, wherein the migration policy comprises the configuration of the client device includes a spinning disk drive.

15. A non-transitory computer-readable medium comprising program code that is executable by a processor for causing the processor to:
  determine, from among a plurality of storage nodes of a scale-out system, that a first storage node is uncoupled to a backup power supply and that a second storage node is coupled to the backup power supply, each storage node of the plurality of storage nodes being configured to analyze their hardware to detect a presence of the backup power supply and send an indication of the presence to the management node;
  receive device characteristics describing a first type of workload and a configuration for a client device associated with the first storage node, the configuration specifying a second type of a plurality of resources of the client device and a number of each resource of the plurality of resources;
  determine the client device satisfies a migration policy based on the device characteristics; and
  migrate the client device to the second storage node based on the client device satisfying the migration policy.

16. The non-transitory computer-readable medium of claim 15, wherein the client device is a first client device and further comprising program code that is executable by the processor for causing the processor to:
  receive, from the first storage node, device characteristics describing the first type of workload and the configuration for a second client device associated with the first storage node;
  determine the second client device does not satisfy the migration policy; and
  maintain the second client device association with the first storage node.

17. The non-transitory computer-readable medium of claim 15, wherein each storage node in the plurality of storage nodes is configured to determine the device characteristics and responsively transmit a status communication indicating the device characteristics to a management node of the scale-out system.

18. The non-transitory computer-readable medium of claim 15, further comprising program code that is executable by the processor for causing the processor to:
  receive device characteristics for each storage node in the plurality of storage nodes; and
  generate a recommendation indicating a number of the plurality of storage nodes to be coupled to one or more backup power supplies based on the device characteristics.

19. The non-transitory computer-readable medium of claim 15, further comprising program code that is executable by the processor for causing the processor to enable write-back caching for the second storage node based on the second storage node being coupled to one or more backup power supplies.

20. The non-transitory computer-readable medium of claim 15, wherein the migration policy comprises the first type of workload being a write-intensive workload.

* * * * *